United States Patent [19]
Jayashankar et al.

[11] Patent Number: 5,887,241
[45] Date of Patent: Mar. 23, 1999

[54] METHOD OF MANUFACTURE OF LOW $O_2$ CONTENT $MOSI_2$/SIC COMPOSITE BODIES

[75] Inventors: S. Jayashankar, Gainesville, Fla.; Kyung-Tae Hong, Seoul, Rep. of Korea; Michael J. Kaufman, Gainesville, Fla.

[73] Assignee: University of Florida, Gainesville, Fla.

[21] Appl. No.: 762,001

[22] Filed: Dec. 11, 1996

[51] Int. Cl.$^6$ ................................................ B22F 3/14
[52] U.S. Cl. ................................ 419/14; 419/48; 419/54; 419/57
[58] Field of Search ................................ 419/14, 48, 54, 419/57

[56] References Cited

U.S. PATENT DOCUMENTS

| | | | |
|---|---|---|---|
| 3,519,503 | 7/1970 | Moore et al. | 148/11.5 |
| 4,927,792 | 5/1990 | Petrovic et al. | 501/92 |
| 5,000,896 | 3/1991 | Petrovic et al. | 264/86 |
| 5,079,195 | 1/1992 | Chiang et al. | 501/92 |
| 5,340,531 | 8/1994 | Jayashankar et al. | 419/10 |
| 5,454,999 | 10/1995 | Jayashankar et al. | 419/32 |

OTHER PUBLICATIONS

Maloy et al., *J. Am. Ceram. Soc.*, vol. 74, No. 10, "Carbon Additions to Molybdenum Disilicide: Improved High–Temperature Mechanical Properties," pp. 2704–2706 (1991).

Schwarz et al., *Mater. Sci. Eng.*, vol. A155, "Synthesis of molybdenum disilicide by mechanical alloying," pp. 75–83 (1992).

Hardwick et al., *Scripta Metall.*, vol. 27, "Reaction Synthesis of $MoSi_2$ from High Purity Elemental Powders," pp. 391–394 (1992).

Stinton et al, American Ceramic Society Bulletin, vol. 67, No. 2, "Advanced Ceramics by Chemical Vapor Deposition Techniques," pp. 350–355 (1988).

Stinton et al, American Ceramic Society Bulletin, vol. 65, No. 2, "Synthesis of Fiber Reinforced SiC Composite by Chemical Vapor Infiltration," pp. 347–350 (1986).

Messner et al, *J. Am. Ceram. Soc.*, vol. 73, No. 5, "Liquid Phase Reaction Bonding of Silicon Carbide Using Alloyed Mo–Si Melts," pp. 1193–1200 (1990).

*Primary Examiner*—Daniel J. Jenkins
*Attorney, Agent, or Firm*—Kerkam, Stowell, Kondracki & Clarke, P.C.; Dennis P. Clarke

[57] ABSTRACT

A method for shaping a consolidated, substantially oxygen-free, equiaxed $MoSi_2$/SiC composite body having an average grain size of 10 μm or less, a SiC content of 2 to 60 v/o and relatively low strength and relatively high ductility comprising subjecting the composite body to plastic deformation under conditions of forming temperature and rate of deformation such that grain growth is substantially avoided, the $MoSi_2$/SiC composite body being obtained by providing particles of molybdenum, silicon and carbon in a proportion relative to each other required to produce a composite powder of $MoSi_2$ and SiC having a composition in that segment of the ternary diagram of FIG. 1 designated A, and subjecting the particles to mechanical alloying under conditions and for a time sufficient to produce the composite powder, followed by consolidation of the composite powder.

17 Claims, 6 Drawing Sheets

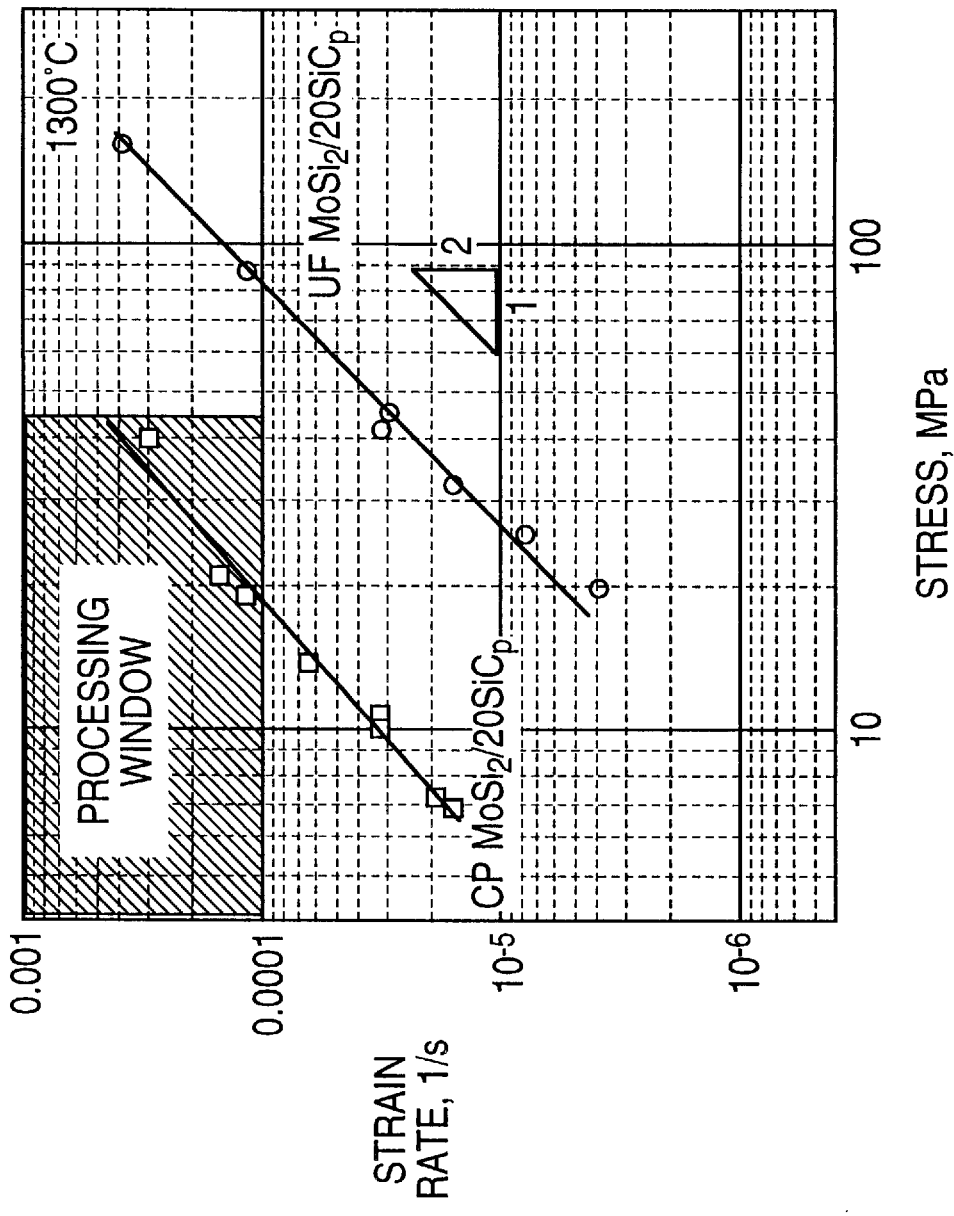

METHOD OF MANUFACTURE OF LOW O$_2$ CONTENT MOSI$_2$/SIC COMPOSITE BODIES

Research leading to the completion and reduction to practice of the invention was supported, in part, by the Defense Advanced Research Projects Agency, Office of Naval Research, Department of Defense, Grant Nos. MDA 972-88-J-1006 and N00014-91-J-4075. The United States Government has certain rights in and to the claimed invention.

BACKGROUND OF THE INVENTION

1. Field of the Invention

The present invention relates to a method for shaping a particular consolidated ceramic composite having relatively low strength and relatively high ductility.

2. Description of the Prior Art

Silicides of transition metals such as molybdenum disilicide and composites comprising matrices of the transition metal silicide reinforced with silicon carbide (SiC) are considered potential materials for structural applications due to their high melting points, excellent oxidation and corrosion resistance, low densities and good electrical and thermal conductivity. However, the use of MoSi$_2$ is limited as a structural material due to its low ambient temperature, fracture toughness and poor elevated temperature strength.

The high melting point of MoSi$_2$, coupled with its line compound characteristics, pose considerable difficulties in its processing. Consequently, powder processing has been the preferred fabrication route due to the lower processing temperatures that it affords. Unfortunately, it also results in the incorporation of silica (originally formed on the surfaces of the powders as an oxide layer) into the consolidated bodies. The presence of grain boundary silica in the consolidated bodies is detrimental to the high temperature properties of the MoSi$_2$ composites since it softens above approximately 1,200° C. and causes enhanced deformation of the MoSi$_2$ body by possibly promoting viscous grain boundary sliding. Thus, control and reduction of the grain boundary silica is essential in order to improve the high temperature properties of MoSi$_2$.

Prior art methods have endeavored to control the silica content (hence, the oxygen content), and thus improve the high temperature properties of MoSi$_2$. For instance, Maxwell [NACA RM E52B06 (1952)] varied the grain size and the carbon content and found that a fine grained material with carbon additions had better creep properties and a lower high temperature plasticity than a similar grain sized material without carbon additions. More recently, Maloy et al [Journal of the American Ceramic Society, Vol. 74, page 2704 (1991)] also reported improved high temperature fracture toughness with increasing levels of carbon additions. However, substantial (~40%) weight losses were reported on consolidating these samples, resulting in uncontrolled formation of molybdenum rich second phases. Hardwick et al at Rockwell International [Scripta Metallurgica et Materialia, Vol. 27, "Reaction Synthesis of MoSi$_2$ from High Purity Elemental Powders," pages 391–394 (1992)] attempted to process oxygen-free MoSi$_2$ by conducting all the powder handling and consolidation operations under a vacuum or inert atmosphere. However, these approaches [Hardwick et al, supra; and Schwarz et al, Materials Science and Engineering, Vol. A155, page 75 (1992)] are impractical from the standpoint of processing bulk structural parts due to the difficulties involved in the scale-up of evacuation systems, as well as the excessive costs associated with such processes. Other methods of forming MoSi$_2$/SiC composites, as described in U.S. Pat. Nos. 4,927,792 and 5,000,896, still do not deal with the problem of controlling or limiting the oxygen content in the MoSi$_2$ matrices.

In view of these considerations, it is clear that further enhancements in the properties of MoSi$_2$ and MoSi$_2$/SiC composites are possible only by limiting/eliminating the silica in the matrix, along with close control of the overall stoichiometry of the body, through the use of economic processing schemes which do not necessitate elaborate care during powder handling. Such methods embodying these requirements are taught in copending U.S. patent application Ser. No. 08/538,004 filed Oct. 2, 1995, and U.S. Pat. Nos. 5,454,999 and 5,340,531, and represent considerable advancements in the art of processing of MoSi$_2$ bodies. The entire contents and disclosures of U.S. patent application Ser. No. 08/538,004 and U.S. Pat. Nos. 5,454,999 and 5,340,531 are incorporated herein by reference.

Formation of shaped bodies of MoSi$_2$ also poses significant challenges. Being hard and brittle at room temperature, MoSi$_2$ thus has very poor machinability. Accordingly, room temperature shape forming is limited to such processes as grinding and polishing. In addition to being expensive and time consuming, such processes result in a considerable waste of expensive material. Such processing bottlenecks increase production costs, thereby hindering the large volume production of MoSi$_2$ bodies.

A variety of conventional shape forming processes such as sintering, chemical vapor infiltration, liquid metal reactive infiltration and injection molding have been utilized in the fabrication of MoSi$_2$ bodies. However, each of these processes has intrinsic limitations.

The use of sintering, for example, results in shrinkage of the body, the extent of which is dependent on the green density, sintering temperature, sintering atmosphere, etc. Moreover, recent studies on the sintering of MoSi$_2$ bodies have shown that substantially high temperatures and very fine particle sizes are needed to achieve full densification by sintering, in addition to the use of hydrogen-containing atmospheres.

Chemical vapor infiltration [Stinton et al, "Advanced Ceramics by CVD Techniques," American Ceramic Society Bulletin, Vol. 67, No. 2, pages 350–355 (1988); and Stinton et al, "Synthesis of Fiber Reinforced SiC Composite by CVI," American Ceramic Society Bulletin, Vol. 65, No. 2, pages 347–350 (1986)] of MoSi$_2$ and SiC bodies, aside from needing appropriate gaseous precursors, is nevertheless limited by the very slow deposition rates [1–2 weeks]. Furthermore, the clogging of the exterior pore channels during the processing necessitates expensive modifications to the process such as the superimposition of appropriate temperature gradients and the use of intermediate (time-consuming and expensive) machining operations in order to form a pore-free, fully dense body.

Liquid metal infiltration, while being a well established, relatively quick and inexpensive method of forming dense MoSi$_2$/SiC bodies, has been traditionally plagued by the inability to achieve complete conversion of the reactant silicon and carbon; the result is the presence of residual silicon and carbon in the material, which is detrimental to the optical and mechanical properties. Furthermore, issues such as capillarity effects and wetting, which are dependent on the preform and melt characteristics, need considerable optimization as a prerequisite to extension of such techniques to systems of variable compositions. However, there have been recent successes in resolving this problem, as for example, by the methods of Chiang et al in U.S. Pat. No. 5,079,195 and Messner et al in J. Am. Ceram. Soc., Vol. 73, No. 5, "Liquid Phase Reaction Bonding of Silicon Carbide Using Alloyed Mo—Si Melts," pages 1193–1200 (1990). Similarly, injection molding, while certainly being amenable to the formation of complex shapes, is limited in the maximum dimensions of producible parts, due to the difficulties associated with the efficient burnout and removal of the organic binder material used in the green forming steps.

In view of the difficulties experienced in the traditional ceramic processing routes, traditional plastic deformation processes offer an attractive, worthwhile, low cost alternative to the net shape manufacture of $MoSi_2$ articles in consideration of the ductile characteristics exhibited by $MoSi_2$ above ~1,200° C. Plastic deformation offers the possibilities of a drastic reduction in the production costs compared to the earlier described processes while enabling larger scale production of bodies for use in structural applications.

However, the phenomenon of work hardening, wherein a body suffers increasing resistance to an applied deformation with increasing strain, makes shape-forming difficult to achieve in practice. It has been noted that the large grained $MoSi_2$ materials undergo considerable work hardening at elevated temperatures. Such work hardening characteristics, while being welcome from a service consideration, are detrimental from a processing standpoint since they imply increasing resistance to deformation. The problem is further compounded considering the fact that the deformation processing of advanced materials is usually in the regime of 1,250° C. and above, where the choice of die and plunger tooling materials becomes restricted and expensive with an increase in the operating stress levels of the forming presses. Furthermore, work hardening characteristics also increase the tendency of the body to fracture (crack) with increasing levels of deformation, thereby limiting the extent of deformation imparted in the forming operation. In addition, necking (plastic) instabilities may occur during the deformation process and limit the useful attainable deformation.

On the other hand, some metallic and ceramic materials undergo large deformations under relatively low stresses at temperatures above half their absolute melting temperatures, when their grain size is small, below 10 $\mu$m. This phenomenon is referred to in the art as "superplasticity." For such metallic and ceramic materials, it is preferable to shape these materials by initially deriving materials comprising fine grain structures and subsequently deforming them under controlled conditions of strain rate and temperatures, thereby utilizing their favorable (superplastic) deformation characteristics. Such deformation occurs at stress levels far lower than the usual yield points (in coarse grained material) without the instabilities associated with necking. Thus, large, uniform, crack-free deformations of the order of several hundred percent can be obtained as a result of such deformation.

Low stress, high ductility-imparting deformation processes such as superplastic deformation have been used considerably in the past in the production of metallic/ceramic articles and composite articles possessing high strength at high temperature. In U.S. Pat. No. 3,519,503, Moore et al teach a forging process wherein certain alloys, including those suitable for high temperature gas turbine applications, may be shaped to complex configurations under very low pressures. The processes taught therein also depend on the proper processing of the alloys to their temporary condition of low strength and high ductility and maintain such conditions throughout the duration of the forming process. The "Gatorizing" process, as described in U.S. Pat. No. 3,519,503, is thus an excellent example of the utilization of the low flow stresses to produce hitherto unworkable superalloy forgings with very close tolerances.

An important point to be noted herein is that the design criteria for high temperature structural components, to which structural materials in general, and $MoSi_2$ in particular have particular relevance, requires the use of alloys that maintain a high degree of strength at high temperature, in addition to oxidation resistance. Generally, while it has been possible to find materials which meet the high strength requirements at high temperatures, the very improvements in the service properties that are required of these materials are often achieved at the expense of the fabricability of the alloys. For instance, substantial difficulties, as encountered during the sintering of high strength borides and carbides, have been attributed to their covalent-bond characteristics which, while causing enhanced resistance to deformation, also restrict diffusion, so essential for the sintering operation. Fabrication of such bodies has thus been traditionally performed under conditions of high temperature and pressure, which increase the processing costs. Likewise, conventional casting routes, while generally providing the large grain sizes desirable for high temperature use, are unsuitable for high melting materials due to problems of crucible-melt interactions (in addition to lack of suitable containment materials) and the ubiquitous segregation problems. In addition, volatilization of certain elemental components is also frequently encountered while melting these materials. Powder routes, while seemingly offering a viable alternative for the production of large grain sizes, are also constrained by densification problems, especially for materials with coarse starting powder sizes. The primary reason is that the governing mechanisms for strengthening are the same as those of deformation in the service and processing temperature regimes. Such difficulties in processing seriously hinder the development of viable structural materials due to unfavorable economics involved in their processing.

In view of the potential attractiveness of the low stress, high ductility imparting deformation processes (superplastic deformation), it would be desirable to adapt this process to $MoSi_2$ bodies. When subjected to uniaxial compressive stress at controlled strain rates and controlled temperatures, $MoSi_2$/SiC bodies show a high degree of uniform deformation at a constant stress. Furthermore, the stress levels associated with such deformation are in the range of 5–50 MPa, under reasonably high strain rates and at reasonably low temperatures. However, these low stress levels imply that the material is not best suited for use in load-bearing applications.

Fabrication to close tolerances is critical to the utility of a material on an economically feasible scale in aerospace engine applications. Many of the parts are moving/rotating, thus requiring close tolerances not only in initial assembly, but also during subsequent use at service temperatures. Therefore, the use of near net shape forming techniques to form parts to within tight dimensional tolerances would greatly enhance the economic and technical viability of $MoSi_2$, provided that the products would be useful in load-bearing applications.

It is an object of the present invention to provide a method of producing substantially silica-free compositions of matter comprising the matrix of molybdenum disilicide having SiC dispersed therein.

It is another object of the present invention to produce articles of high formability (temporary high ductility and low strength condition) through providing a microstructure that is substantially homogeneous, both in composition and structure, which possesses fine equiaxed grains of $MoSi_2$ with a fine, uniform dispersion of SiC therein, and with substantially low silica content.

It is a further object of the present invention to shape-form the bodies to the desired configuration and tolerances in this temporary condition of high formability.

An additional object of the present invention is to retrieve the bodies from their temporary condition of low strength and high ductility to one of high strength and low ductility and, most importantly, to control the level of such achievable strength maximum through the control of the starting alloy composition.

Yet another object of the present invention is to indirectly achieve such control through a control of the maximum grain size obtainable after a heat treatment step.

A further object of the present invention is to control such attainment of grain size through control of the volume of SiC in the matrix which, in turn, is obtainable through appropriate control of the starting composition.

A still further object of the present invention is to provide for improved reliability of the objects manufactured.

It is an additional object of the present invention to produce intricate-shaped articles to close tolerances with minimum wastage of charge material and with a minimum of post-finishing operations such as grinding, etc.

Finally, it is yet another object of the present invention to provide articles containing $MoSi_2$ and SiC that are useful at elevated temperature or at ambient temperature through appropriate modifications in the processing conditions such as composition, grain size and the like.

SUMMARY OF THE INVENTION

The above and other objects are realized by the present invention, one embodiment of which relates to a method for shaping a consolidated, substantially oxygen-free, equiaxed $MoSi_2$/SiC composite body having an average grain size of 10 $\mu$m or less, a Sic content of 2 to 60 v/o and relatively low strength and relatively high ductility comprising subjecting the composite body to plastic deformation under conditions of forming temperature and rate of deformation such that grain growth is substantially avoided, the $MoSi_2$/SiC composite body being obtained by providing particles of molybdenum, silicon and carbon in a proportion relative to each other required to produce a composite powder of $MoSi_2$ and Sic having a composition in that segment of the ternary diagram of FIG. 1 designated A, and subjecting the particles to mechanical alloying under conditions and for a time sufficient to produce the composite powder, followed by consolidation of the composite powder.

BRIEF DESCRIPTION OF THE DRAWINGS

FIGS. 2a, 2b, 2c and 3 are depictions of variations in flow stress as a function of strain rate for certain compositions of the invention.

DETAILED DESCRIPTION OF THE INVENTION

The invention is predicated on the discovery of the ability of $MoSi_2$-based materials to undergo deformation under relatively low stresses at elevated temperatures under certain microstructural conditions.

The present inventors have studied the deformation of various classes of $MoSi_2$ materials at elevated temperatures. It has been found that hot pressed $MoSi_2$ and SiC-containing compositions obtained using the methods as taught in U.S. Pat. No. 5,454,999, possessing a microstructure of fine equiaxed grains of $MoSi_2$ with SiC dispersed therein (i.e., composition A of FIG. 1 [nominal composition: 25.10 at. % Mo, 62.54 at. % Si, 12.35 at. % C]), when subjected to uniaxial compressive stress under conditions of controlled strain rate and temperature, exhibit high ductility under relatively low stresses, with the stress at which the material undergoes the uniform deformation being essentially constant throughout the duration of deformation.

The term "superplasticity" as used herein refers to the ability of a material to be stretched or compressed uniformly under levels of stress notably lower than the general yield point of the material. For deformation under tension, neck-free elongations of at least 100% are needed.

Figure 1:
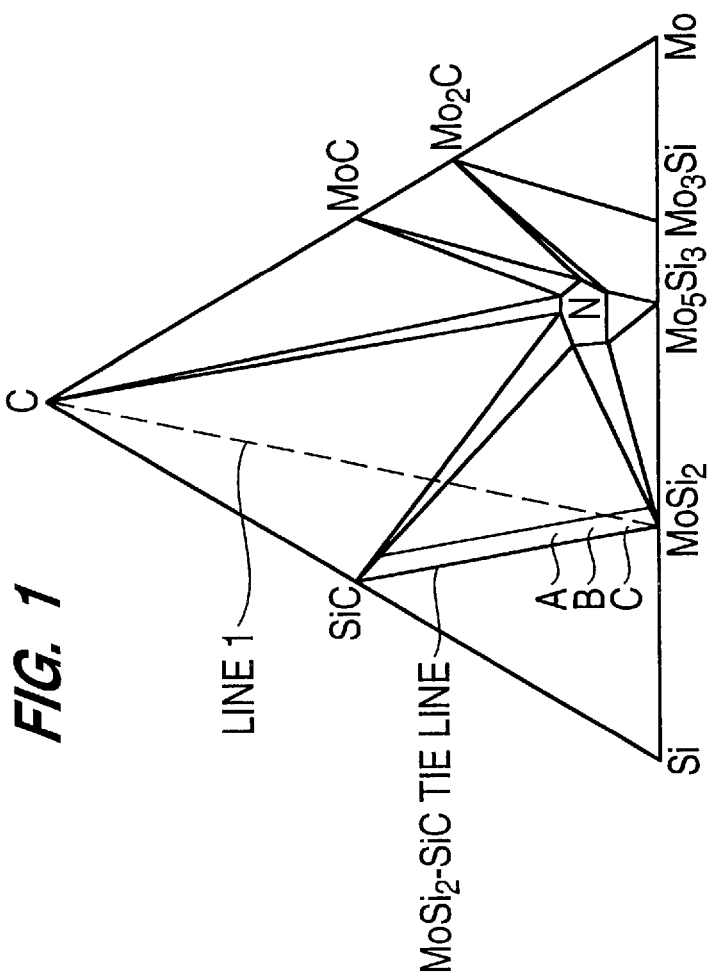
FIG. 1 is a ternary diagram of Mo—Si—C compositions.

It was also found that $MoSi_2$/SiC bodies with a substantially larger $MoSi_2$ grain size with SiC distributed along the grain boundaries (e.g., composition C of FIG. 1 [61.48 wt. % Mo, 37.72 wt. % Si, 0.795 wt. % C]) exhibited a significantly higher creep strength and work hardening characteristics in contrast to the fine grain sized alloys of composition B of FIG. 1 [55.92 wt. % Mo, 40.63 wt. % Si, 3.44 wt. % C] which exhibited large deformations under relatively low and constant flow stresses.

The present invention also utilizes the phenomenon wherein second phase particles, e.g., SiC, pin the movement of the matrix ($MoSi_2$) grain boundaries during elevated temperature heat treatments, thus limiting grain growth and hence the maximum attainable grain size during such heat treatment. Moreover, the invention recognizes the dependence between the maximum attainable grain size and the obtainable properties. The invention also recognizes the interplay between the chosen starting composition and the SiC content of the body.

The term "net shape" as used herein refers to the fabrication of articles to substantially close to final contours and dimensions such that minimal post-forming operations are necessary.

Initial efforts were aimed toward improving the elevated temperature strengths of $MoSi_2$ based composites which were under potential consideration for high temperature applications. Since it was widely speculated, yet scantily documented, that the poor high temperature properties were due to the presence of a non-wetting intergranular silica phase, initial efforts were directed toward the objective of investigating the above. It was subsequently discovered that the unique process taught in U.S. Pat. No. 5,454,999 not only enabled the manufacture of silica-free bodies of $MoSi_2$, but also allowed for the tailoring of the compositions to vary the SiC content.

EXAMPLE

In order to elucidate the effect of the $SiO_2$ on the elevated temperature properties, four-point bend tests were conducted on silica-containing, as well as silica-free, $MoSi_2$/20 v/o SiC material (grain size 5–7 $\mu$m) at temperatures from 25° C. to 1,450° C.

While brittle behavior was observed in the bars tested up to 1,200° C., bars tested above this temperature exhibited significant amounts of crack-free deformation when tested in a four-point bend test. The deformation occurred at constant stress levels throughout the duration of the deformation and no breakage of the bar was observed even after extended amounts of deformation. In addition, comparison of the silica-free and silica-containing bodies revealed that the elimination of silica at these fine grain sizes brought about improvements in the strength. However, the gains in strength were insufficient to warrant their consideration as structural materials at T~1,200° C.

Since the behavior of the bars under the four-point bending seemingly resembled a condition of low strength and high ductility, further tests were conducted by the present inventors to confirm this effect. Accordingly, compression test samples were electro-discharge machined from the billets fabricated using the teachings set forth in U.S. Pat. No. 5,454,999. Compression testing was carried out in a servohydraulic controlled machine under a flowing argon atmosphere at 1,300° C. The strain rate of the sample was changed during the course of the test and the stress at which the deformation proceeded was monitored.

Figure 2A:
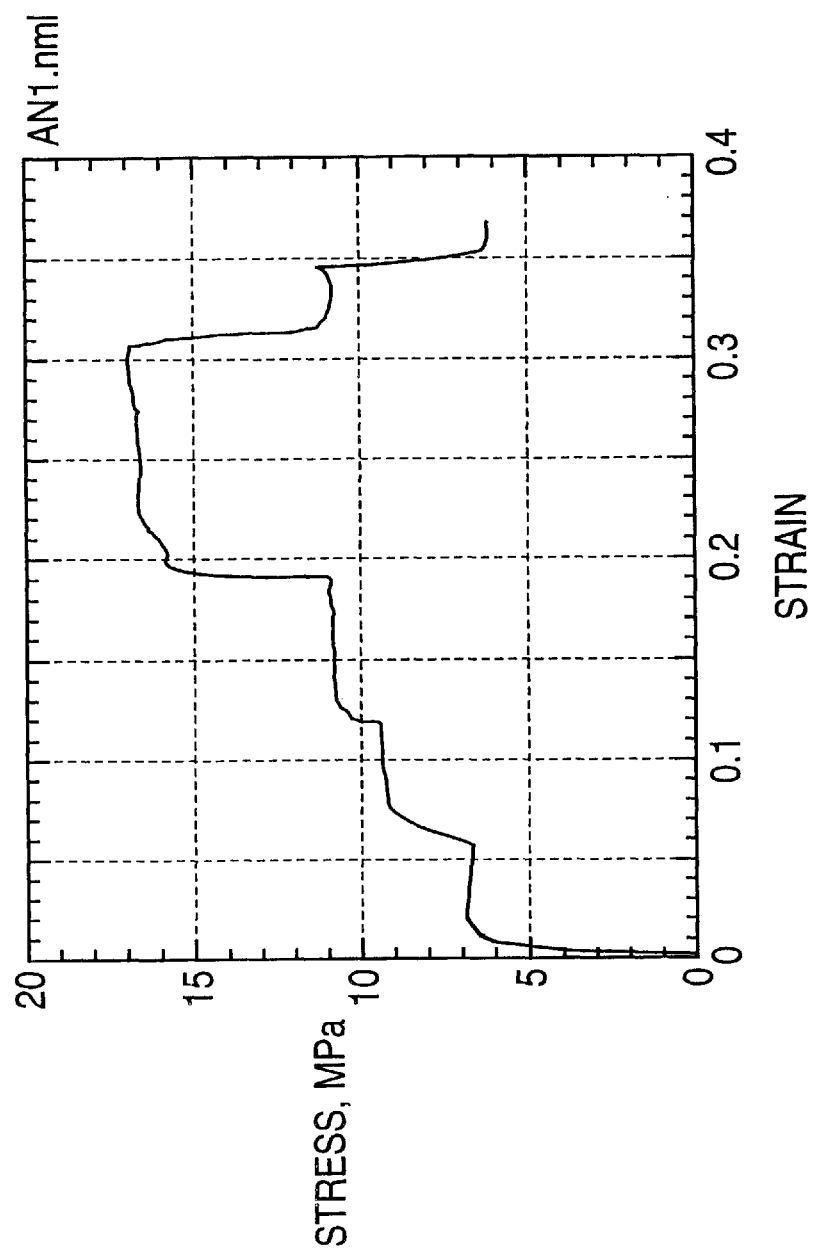
Figure 2B:
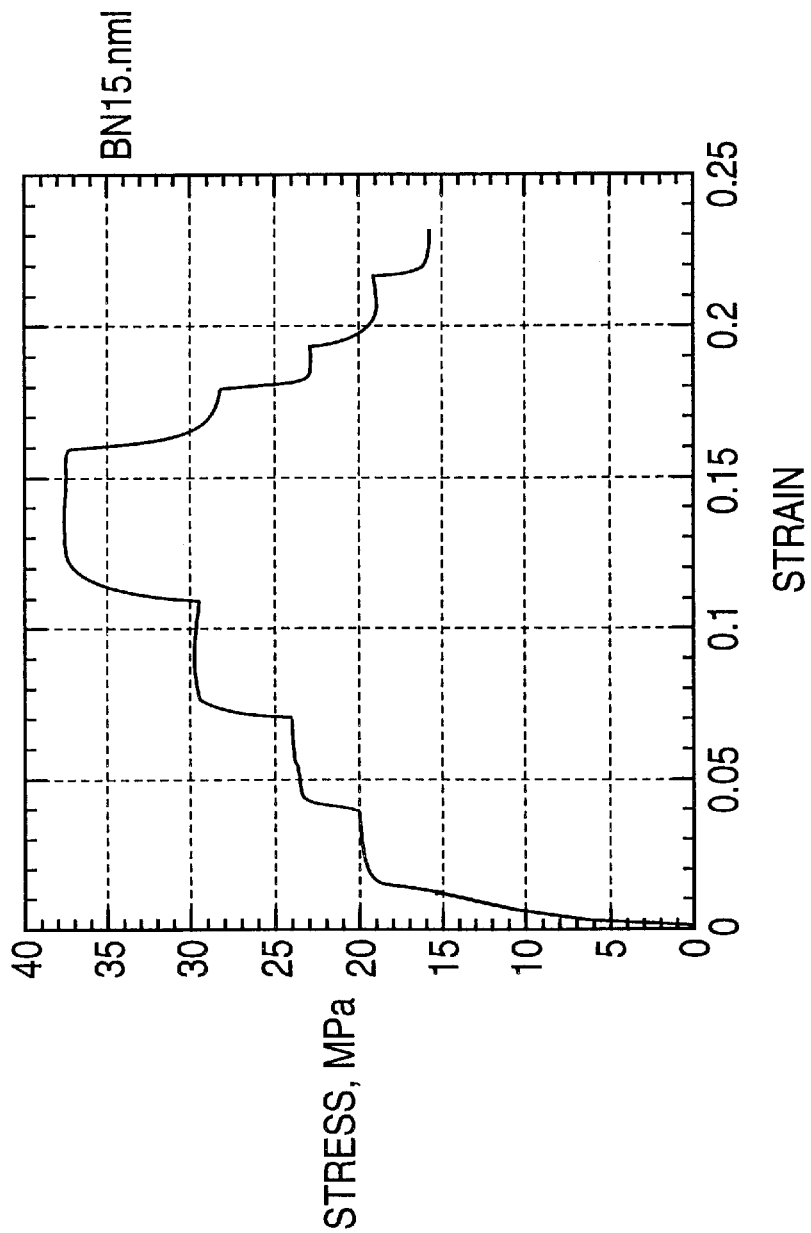
Figure 3A:
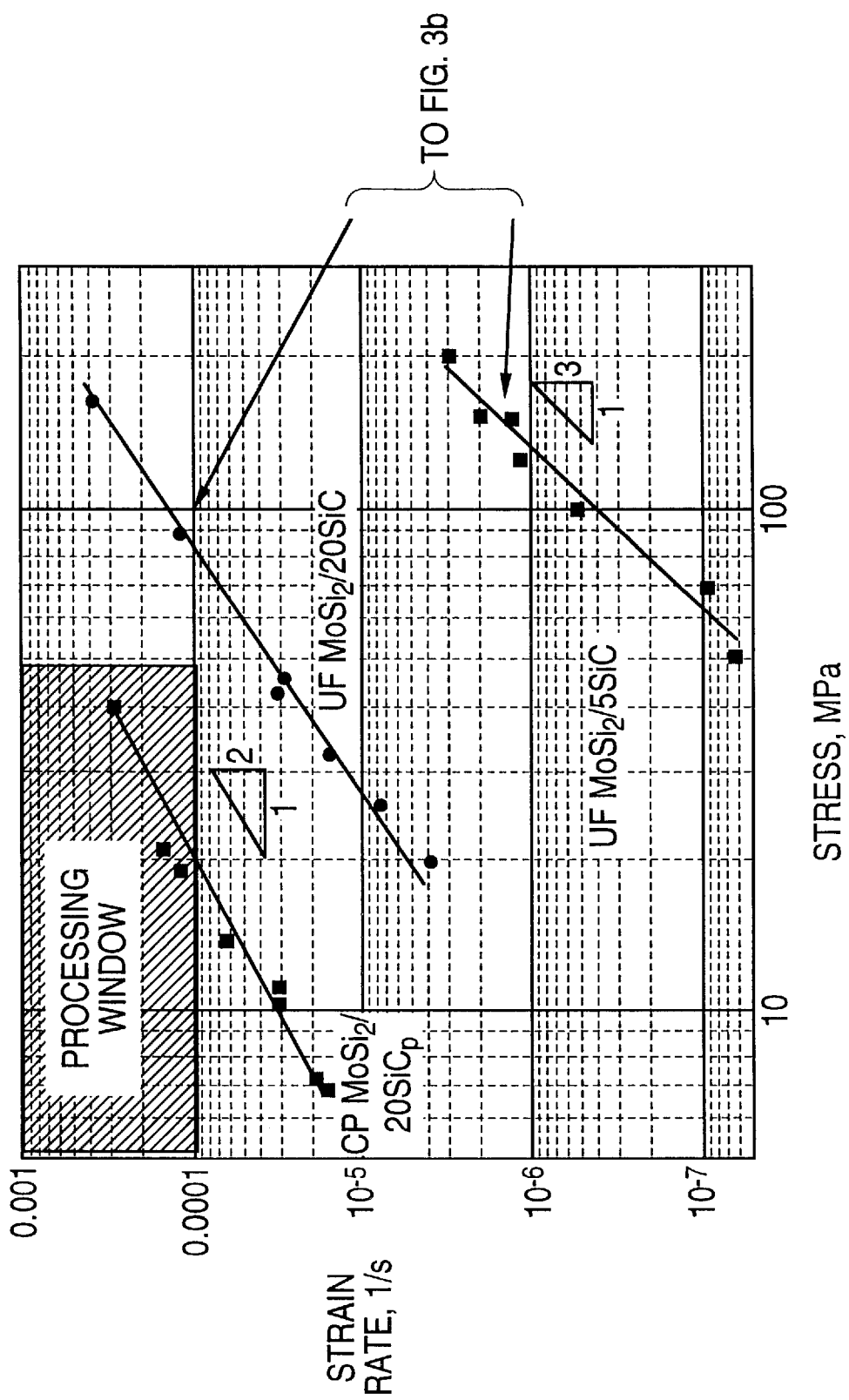
Figure 3C:
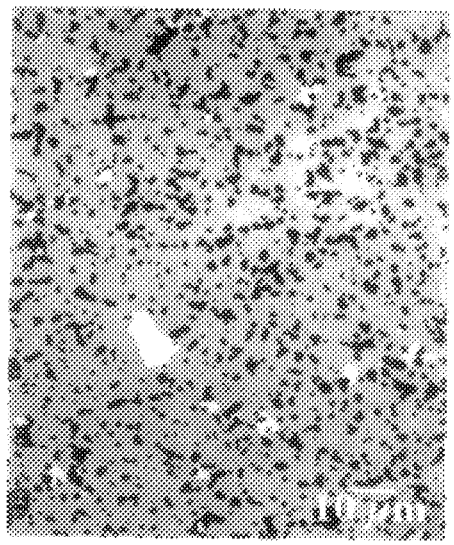
Figure 3B:
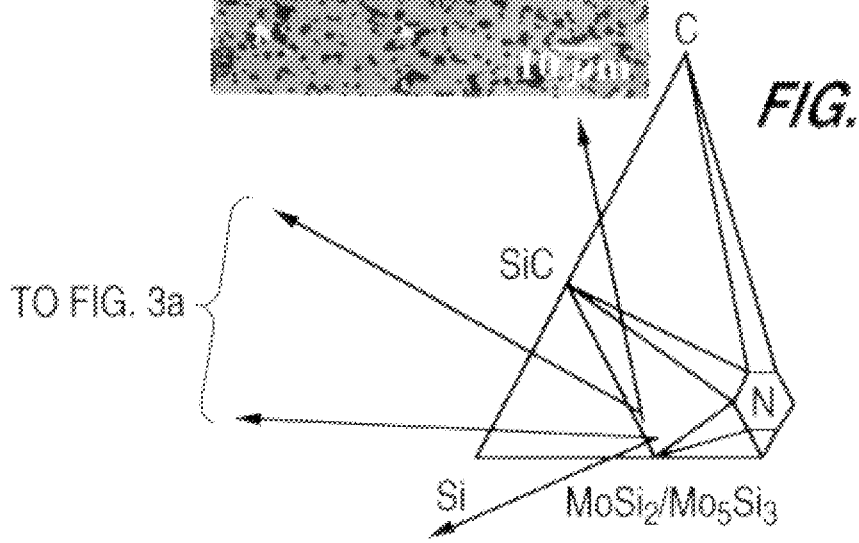
Figure 3D:
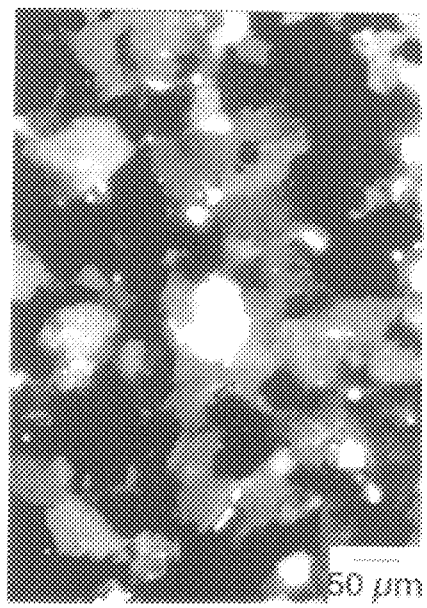

Variations in the flow stress as a function of strain rate were determined for both classes of materials through the use of the above-mentioned strain rate change tests (SRC); these are plotted in FIGS. 2a–2c. For strain rates of between $10^{-5}$ s$^{-1}$ and $10^{-3}$ s$^{-1}$, both the silica-containing and silica-free samples exhibited deformation under a constant flow stress. For comparable matrix grain sizes (5–7 $\mu$m) and volume fraction reinforcement (20 v/o SiC), the elimination of $SiO_2$ resulted in ~5 fold increase in the flow stress over the range of strain rates tested at 1,300° C. The silica-free material also exhibited ~1.5 order of magnitude improvement in the creep rate.

The governing equation for high temperature flow is given by $\epsilon = A \sigma^n \exp(-Q/kT)$ wherein A and k are constants, $\epsilon$ is the strain rate, $\sigma$ is the flow stress, n is the stress exponent, Q is the activation energy and T is the absolute temperature. Thus, the slope of the log $\epsilon$–log $\sigma$ plot (FIG. 2c) determines the value of the stress exponent and serves to elucidate the operative deformation mechanism. It is apparent from the figure that the slopes of the log $\epsilon$ v. log $\sigma$ plots are very similar for both classes of material with n~2.5 in the regimes of interest. Stress exponent values of close to 2 are usually associated with boundary deformation mechanisms (e.g., grain boundary sliding, Nabarro-Herring or Coble mechanisms). The compression tests confirmed that (a) silica elimination achieved some improvement in the high temperature strength and (b) the deformation mode remained unchanged through the elimination of silica for the ~5–7 $\mu$m $MoSi_2$ grain size investigated. Based on the stress exponents, grain boundary sliding was the probable deformation mechanism.

In consideration of the fact that the high temperature strengths of $MoSi_2$ materials were in reality the creep strengths and in analyzing the results of the $SiO_2$-free and $SiO_2$-containing materials, it was thus apparent to the inventors that high temperature improvements in strengths could be derived through increases in the grain size. Since the choice of $MoSi_2$ for structural applications is due to its anticipated resistance to lattice-controlled deformation (dislocational creep) rather than the boundary deformation (grain boundary sliding) as seen here, it was further theorized that further strengthening was possible through altering the deformation mode.

Although it was originally anticipated that the second phase particles at the grain boundaries would impede grain boundary sliding and thus contribute to increased strengthening, the weakening due to grain refinement of the particles far outweighed any pinning effects the SiC particles would have had on the strength. Rather than in keeping with prior expectations of strengthening, addition of second phase particles to $MoSi_2$ refine the grain size and thereby weaken the material due to the increased contribution of boundary deformation mechanisms. It was thus thought that the best way to improve the creep strength was through increases in the grain size, primarily brought about through decreases in the second phase content and hence a decrease in the refining effect. Cessation of grain boundary sliding and thus strengthening could then be obtained in the material.

Accordingly, substantially silica-free $MoSi_2$/SiC composites with substantially large grain size (~40 $\mu$m linear intercept grain size) were processed simply by changing the starting powder composition (composition C corresponding to 61.48 wt. % Mo, 37.72 wt. % Si, 0.795 wt. % C) and subjected to strain rate change tests in compression at 1,300° C. In contrast to the fine grained silica-free and silica-containing composites, the coarse grained silica-free samples exhibited significant work hardening characteristics. Additionally, the yield stress values of the large grain size bodies showed considerable improvement over the 5–7 $\mu$m grain size body for comparable strain rates. These findings were thus in line with the hypothesis of the inventors that the grain size effect overshadowed the particle strengthening effect and that composition control could effectively dictate the maximum achievable strength levels. Compression creep tests were also performed at 1,300° C. and the slopes of the log $\epsilon$ v. log $\sigma$ plots (FIG. 3) revealed n values of ~3.5, indicating a dislocational creep mechanism. Thus, a change in the starting powder composition also shifted the controlling mechanism from grain boundary sliding to dislocation controlled deformation.

Conventionally, superplasticity of an alloy is determined through measurements of strain rate sensitivity, either by a series of tensile tests at different strain rates at the temperature of interest or by a single test undertaken at a series of strain rates. Superplasticity requires high strain rate sensitivity (m>0.3 to 1). For ceramic and intermetallic materials, grain boundary cohesivity (absence of intergranular brittleness) is yet another requirement of structural superplasticity so that large tensile deformations are facilitated without fracture.

The values of the stress exponent obtained during the investigation on the fine grained $MoSi_2$ suggest the likely operation of superplasticity. The fine grain sizes, the relatively homogeneous microstructure, the high homologous temperature (T/T$_m$>0.5) and the high strain rate sensitivities (m~0.5) in compression, along with the evidence of uniform deformation, suggest the likely operation of structural superplastic behavior. Although tensile testing, usually used to establish the requirement of grain boundary cohesivity, was not performed, the grain boundary cohesivity requirement is likely to be satisfied since the deformation studies on $MoSi_2$ single crystals have shown the activation of sufficient deformation mechanisms at T>1,250° C. for the requirement of strain compatibility at the boundary to be met.

The present results are thus perhaps the first demonstrable evidence of superplastic behavior in nearly two phase silica-free $MoSi_2$/SiC bodies. It should be noted that the prior art has shown considerable softening of $MoSi_2$ at elevated temperatures (>900° C.) wherein deformation under nearly constant stress has been noted. This is possibly due to the softening of the silica at high temperatures since silica, rather than $MoSi_2$, controls the deformation behavior. Likewise, flow softening of $MoSi_2$ at 900° C. has also been reported for large grained $MoSi_2$. This phenomenon is due to large scale microcracking within the body due to unaccommodated grain boundary strains.

The processing route used in the fabrication of the bodies has a significant bearing on the formability of the material. As noted in the prior art, structural superplastic flow requires uniform deformation which imposes stringent requirements on the material microstructure insofar as near uniform grain sizes and uniform chemical homogeneity; otherwise, shear bands might be nucleated at heterogeneities which, in turn, would lead to non-uniform deformation and subsequent loss of superplastic characteristics. The method taught in U.S. Pat. No. 5,454,999 produces fine alloy powders of not only the precise and homogeneous composition and stoichiometry, but also of uniform structure; this, in turn, ensures the attainment of chemically and microstructurally homogeneous fine grained microstructures (subsequent to hot pressing), so very critical for the properties required herein. Furthermore, the use of fine powders as taught in U.S. Pat. No. 5,454,999 results in the use of lower consolidation temperatures and, hence, to a finer grain sized material.

The findings are thus summarized and clearly indicate the following:

(1) $MoSi_2$/SiC material exhibits structural superplasticity in the grain size of less than 10 $\mu$m at 1,300° C., with high strain rate sensitivities and deformation under constant flow stress.

(2) This condition of superplasticity occurs in a favorable processing window (in terms of possible strain rates, temperature and stresses) so as to make it adaptable for commercial exploitation.

(3) These conditions, while being favorable for shape forming, are inimical to their use as a structural material.

(4) Considerable (orders of magnitude) strength improvements of the $MoSi_2$/SiC material are possible simply through grain size control and silica control.

(5) Such grain size control and silica elimination are possible through simple control of the powder compositions.

According to the present invention, the articles possessing the fine equiaxed microstructure with the desired volume fraction of SiC are formed into the intended shapes by the application of a tensile or compressive stress in the low strength, high ductility temperature regime at a reasonably high strain rate.

As stated hereinabove, the present invention contemplates using the teachings set forth in U.S. Pat. Nos. 5,340,531 and 5,454,999 to form a substantially homogeneous and substantially silica-free body containing fine equiaxed grains of $MoSi_2$ and SiC by hot pressing, the body exhibiting a temporary condition of high ductility and low strength, at a given temperature in the range of 1,100° to 1,800° C. and preferably between 1,150° and 1,350° C. This body is worked to the desired complex shape at a predetermined strain rate and under a given forging force at a temperature between 1,100° and 1,800° C. and preferably between 1,150° and 1,450° C. The body is subsequently subjected to an annealing heat treatment to coarsen the grain structure and thus retrieve the body from its temporary condition of low strength and high ductility to a condition of high strength and low ductility. The temperature of the heat treatment is between 1,200° C. and 1,900° C. and preferably between 1,250° C. and 1,800° C. Furthermore, the invention also contemplates controlling the strength and toughness obtained after such heat treatment by controlling the powder alloy starting composition which would, in turn, determine the amount of SiC present which, in turn, would determine the final equilibrium grain size. Such control of the SiC content in forming a substantially silica-free $MoSi_2$/SiC body is already set forth in the above-referenced patents.

The present invention thus consists of the following operations:

(a) powder processing
(b) powder consolidation
(c) shape forming
(d) post-fabrication heat treatment.

The essential and critical features of each operation are as follows:

(a) Powder processing and (b) powder consolidation: The objective of this step is to derive microstructures that are suitable and amenable for subsequent forming and heat treatment operations. The choice of alloy compositions, critical to the determination of the grain size and the achievable properties, is also made at this stage of the process. The powder processing and consolidation operations are performed in accordance with the teachings of U.S. Pat. No. 5,454,999.

An ultrafine grained structure is the principal requirement for materials to exhibit a condition of low strength and high ductility, essential for satisfactory forming. Additionally, the alloy must be compositionally homogeneous (random isotropic and uniform microstructure) even when it is dual or multi-phased. In addition, it is preferable for the matrix to be subject to a range of alloying additions. The teachings of U.S. Pat. No. 5,454,999 enable the attainment of such structures that satisfy the above requirements.

A notable feature of the teaching of U.S. Pat. No. 5,454,999 is the ability to control the amount of SiC in the body through the control of the compositions of the starting powders. The process of the teaching is suited such that uniform, nearly two-phase microstructure, possessing fine grain structure as required for the conduction of the superplastic operation, is obtained. Such obtainment is absolutely critical for the successful performance of the forming operations.

The mechanical alloying approach, as detailed in U.S. Pat. No. 5,454,999, is useful herein to the attainment of the desired initial powders for further derivation of the final microstructures for the following reasons:

(1) fine grained structure
(2) uniform composition
(3) fine powder size.

In addition, the alloying process enables the accurate choice and control of the powder stoichiometry which is essential to the satisfactory control of grain size and SiC content. Furthermore, the fine size of the starting powders as derived from mechanical alloying leads to lower consolidation temperatures and, therefore, to the retention of the fine grain size since grain growth is limited at lower consolidation temperatures.

It should be mentioned that the use of commercial powders to produce fine grained structures, as is commonly known in the art, would lead to higher silica contamination in the powders and the powder-derived microstructures; the current process circumvents these disadvantages due to the benefit of the uniformly dispersed carbon in the powders which reduces silica.

(c) Shape forming: The composites derived at the end of the powder consolidation step possess a microstructure comprised predominantly of equiaxed grains with an average grain size of 10 $\mu$m or below and a silicon carbide content of 2 to 60 v/o and are obtained following the teachings set forth in U.S. Pat. No. 5,454,999. They are subsequently subjected to the forming process under conditions of low strength and high ductility at an economical strain rate.

It is important to avoid grain growth at the processing temperature during the course of the forming operation in order to maintain the low strength/high ductility condition. When the average grain size of the composite material exceeds 10 μm, or when the material is not equiaxed, the material begins to gradually lose its condition of low strength and high ductility. Under these conditions then, shape forming is not possible under low stresses. The micro-structure of the body deformed under such a condition may begin to develop cavities, a phenomenon frequently referred to in the art as "cavitation," which is detrimental to the properties.

The tendency for grain growth during the forming operation may be countered by choosing a lower forming temperature or by increasing the rate of deformation in order that the forming operation be completed with minimal grain growth. The presence of the second phase generally regards the tendency for grain growth of the matrix phase during the deformation. Generally, a larger volume fraction of SiC (second phase, in this case) would increase the stability of the fine grain microstructure of the $MoSi_2$ matrix during deformation.

It is thus apparent that the condition of low strength and high ductility corresponding to the forming operation occurs only when the strain rate/flow stress plot possesses a slope of n of ~2 or less and lies within a forming window defined by relatively low flow stresses (~40–50 MPa) and relatively high flow rates (~0.0001 $s^{-1}$ or higher). Since the flow stress and strain rate plots themselves are functions of the material grain size and the temperature, the processing window as, for example, shown in FIGS. 2c and 3, has to be determined experimentally for each condition (grain size/composition, temperature) of the material.

It is to be emphasized that the boundaries of the processing window were chosen so as to reflect practical and economically viable processing conditions. Thus, for example, the upper stress limit of 40 MPa was chosen based on the maximum operating stresses of the graphite tooling material. Likewise, the upper and lower strain rate limits were chosen based on viable processing times.

It is also preferable that the lower limits of the forming window (temperature, strain rate) be extended to lower temperatures (~1,200° C.) where superplastic operations can be even more advantageously applied with economy. Such minimizations in the grain size of the low strength, high ductility material are within the scope of the current invention. Such reductions in forming temperatures would enable the use of pre-existing tooling materials used in the prior art for the forging of superalloy materials.

One method of possibly lowering the forming temperature is through further refinement in the microstructure derived, for instance, by reducing the $MoSi_2$ grain size from the 5–7 μm grain size level to that of 1–2 μm.

The content of SiC can vary from 5 to 50% and preferably from 10 to 50% by volume. As previously stated, lower second phase loadings face an increased possibility for dynamic grain growth during the forming process which, if left unchecked, would destroy the formability of the material. Thus, lower SiC loadings would perhaps require a lower forming temperature in order to prevent grain growth and thus maintain formability. It is also preferable that the particles be well dispersed and fine so as to maximize their pinning effects.

The optimal processing conditions are experimentally determined by deforming the samples at a multiplicity of strain rates and at various temperatures, determining whether cracks occur under any of these conditions and plotting the results on the log $\epsilon$ v. log $\sigma$ plot. For this purpose, uniaxial compression tests using SiC compression fixtures and cylindrical or parallelepiped specimens with the end faces which are polished, parallel and lubricated are used. In the preferred method of determination, cylindrical or rectangular parallelepiped specimens (preferred dimensions of 4×4×8 mm) having a nominal l/d of ~2 (where "l" is measured along the direction of application of the compressive or tensile stress) are placed in an appropriate support/gripping structure in an appropriate furnace under a controlled atmosphere and a piston is utilized to stretch or compress the workpiece at a constant displacement or strain rate. From these tests, deformation regimes (strain rate, stress and temperature) are established for a given composition and grain size. Deformation is performed in regimes of high strain rate sensitivity and low operating stresses corresponding to economical forming (strain) rates. In the case of compressive tests, it should be noted that the determined regimes are conservative since the tensile deformation rates are usually much higher than those obtained in compression.

The temperature of the forming operation is approximately in the range of 1,150° C. to 1,600° C. and preferably in the range of 1,150° C. to 1,350° C. for a $MoSi_2$ grain size of 5–7 μm. It should be noted that these temperature ranges are dependent on the grain size with decreases in grain size decreasing the lower limit of the temperature range, and vice versa. If the temperature is lowered too far below these values, the regimes of strain rate over which the superplastic forms drop to very slow strain rates and/or high stresses which are economically inviable. Too high a forming temperature would result in substantial recrystallization/grain growth in the microstructure and would consequently destroy the ability of the material to deform under low stresses. The mechanical properties of the shaped articles would also deteriorate. Thus, the forming temperature should be optimized so as to have the widest forming window for deformation.

The forming step can be carried out at a constant strain rate or at a constant displacement rate or under a constant load. The speed of fabrication is experimentally determined and should be kept reasonably high for the given temperature and grain size.

Preferably, the strain rates used are between $10^{-2}$ $s^{-1}$ and $10^{-4}$ $s^{-1}$. Excessively high strain rates, while seemingly assuring a quicker forming operation, may result in fracture and intergranular cavitation. The interlinkage of such cavities would result in structural defects, lowering the strength and reliability of the formed article. Such cavitation could also be detrimental to the oxidation properties of these systems. Likewise, a low strain rate is undesirable since it not only leads to longer (economically unfeasible) forming runs, but also to possible loss of formability due to grain growth processes. The optimum strain rate must, therefore, be arrived at after careful consideration of the above factors. For the manufacture of articles with close tolerances, it is preferable to use the slowest possible strain rate.

For the fabrication of the shapes, molds made of various materials such as high temperature superalloys, alumina, mullite, silicon carbide or fine grain graphite may be used. For forming under protective atmospheres, molds made of graphite may also be used. Other shaping materials will be evident to those skilled in the art. If an inert gas atmosphere is used, alternate die materials such as the TZM molybdenum alloy may also be suitable.

For the production of hollow articles, gas pressure or vacuum can be applied to the interior surface of the primary hot pressed body, while a ceramic mold of the prescribed shape can be placed against the exterior surface of the article to produce the desired shape. Furthermore, spherical objects can be obtained without the use of any constraints through blow molding.

(d) Post-fabrication heat treatment: The shaped body, according to the present invention, has a structure formed predominantly of equiaxed grains similar to that obtained after hot pressing. Such a body is in a condition of low strength and high ductility and, therefore, is not best suited for high temperature applications. A heat treatment designed to enable grain growth is, therefore, necessary for restoring the body to a condition of high strength. The maximum obtainable grain size is controlled by the second phase particles as, for instance, given by the Zener equation [Physical Metallurgy Principles, R. E. Reed-Hill, Second Edition, D. Van Nostrand and Co. (1973)] or the Hellman-Hillert relation [P. Hellman and M. Hillert, as quoted in J. Am. Ceram. Soc., Vol. 73, "Development of Superplastic Structural Ceramics," I-W. Chen and L. A. Xue, pages 2585–2609 (1990)]. Such heat treatment, in addition to promoting grain growth, may substantially reduce any cavities formed during the low stress/high ductility forming operation.

Apart from providing enhanced creep strengths, the large grained MoSi2 bodies also show enhanced resistance to catastrophic failure. For example, blunt flaws such as those introduced due to thermal expansion anisotropy during cool-down have been found in part art methods to provide marked resistance to such catastrophic failures through the blunting of initially sharp cracks that would have otherwise propagated. However, since the fracture stress (due to crack initiation) in coarse-grained, brittle materials is relatively low, such an approach is limited to only such applications where the room temperature tensile properties are not of prime concern.

The heat treatment in the present invention is preferably carried out in a non-oxidizing atmosphere, under atmospheric or applied pressure, at a temperature generally between 1,100° C. and 1,900° C., and preferably between 1,350° C. and 1,800° C. The extent of the heat treatment time varies with the composition of the body and the heat treatment temperature and is generally between 1 and 24 hours. Furthermore, the heat treatment can be performed immediately after the forming operation without once cooling the body, or it may be performed after cooling the shape-formed body down to room temperature and subsequently heating it to the predetermined temperature.

The maximum grain size, $D_{MoSi_2}$, obtainable during the grain growth as a result of the heat treatment is governed by the size, $d_{SiC}$, and the volume fraction, $V_{SiC}$, of the second phase particles and approximately follows the following relation proposed by Zener:

$$D_{MoSi_2} = \text{constant } d_{SiC}/V_{SiC}.$$

For a relatively constant particle size (as generally observed in the present invention), the maximum attainable grain size scales inversely with the volume fraction of the SiC particles. Furthermore, U.S. Pat. No. 5,454,999 teaches the method of controlling such attainment and control of volume fraction of SIC through appropriate variations of the compositions and processing technique. It is, therefore, possible, using the methods of the present invention, to control the maximum attainable grain size subsequent to appropriate heat treatments, through the control of the starting powder composition. Since it is well known in the art that the room temperature and high temperature mechanical properties are effected through grain size, it is obvious that control of the requisite properties is achieved through appropriate control of the starting powder composition.

It is to be noted that there is a minimum amount of SiC that will be formed in the teachings of U.S. Pat. No. 5,454,999, if one were desirous of forming fully silica-free bodies of $MoSi_2$; the amount of SiC would depend on the starting oxygen content of the powders (present in $SiO_2$); such $SiO_2$ transforms to SiC upon the addition of carbon. This amount of minimally formed SiC would be between 0.5 v/o and 10 v/o depending on the oxygen content of the powders. It is possible to minimize such minimum amounts of SiC formable for silica-free bodies by following appropriate procedures designed to eliminate oxygen pick-up during powder handling and consolidation, such as performing the powder handling operations under inert atmospheres or vacuum, as practiced by Hardwick et al, supra, and Schwarz et al, supra.

It is thus to be noted that considerable modifications could be made in respect to the process as described above for the forming of $MoSi_2$-containing bodies. For instance, the submicron powders obtained subsequent to the alloying step of U.S. Pat. No. 5,454,999 can be cold pressed to a density of 50 to 90% of the theoretical, sintered under an argon or nitrogen atmosphere or mixture thereof, at temperatures from 1,150° C. to 1,900° C., and preferably from 1,400° C. to 1,800° C., for a period of 1 to 24 hours to obtain fine, equiaxed, low oxygen content microstructures, required for the forming operations. These and other such modifications are fully covered within the scope of the present invention.

Likewise, a whole range of operations ranging from sinter forging to extrusion to diffusion bonding of $MoSi_2$-based materials can be carried out within the purview of the instant process.

Formation of fiber-reinforced bodies of $MoSi_2$ are also envisaged using the methods of the present invention. The superplastic characteristics of the fine grained material would facilitate easy flow and deformation of the matrix material around the fibers, leading to a pore-free dense matrix reinforcement interface. The characteristics of such an interface may be tailored for toughening (pull-out) or strengthening by appropriate surface treatment, both chemical and physical, of the fibers to control the interfacial characteristics. Such modifications are also covered within the scope of the present invention.

Formation of $MoSi_2$/SiC bodies possessing an elongated fiber morphology is also within the scope of the present invention. In this case, the low strength/high ductility condition would facilitate the hot extrusion of defect-free, two-phase fibers possessing the desired grain size, SiC content and the desired aspect ratio.

Although the invention has been described in detail with specific examples, it is not limited in its broader aspects to specific steps, methods, compositions and combinations thereof, and any improvements to and departures from the invention may be within the scope of the appended claims.

The advantages of the invention are as follows:

(1) Enhanced formability: The fine grain structure and the uniform distribution contribute to enhanced formability for the MA derived bodies compared to conventional forming processes. Thus, complex shape-forming operations requiring large amounts of deformation can be performed in one single step. Accordingly, multistage manufacturing involving welding, machining and grinding can be substantially reduced, if not eliminated.

(2) Reliability: The microstructures are uniform across the cross-section of the part, which means that different regions of the part are more likely to fail at the same stress levels. The secondary shape-forming operations would also effect changes in pore geometry (spherical to flattened oblate spheroid, or acicular). These factors contribute to increased part reliability which is of particular significance to designers.

The high temperature compression data in FIGS. 2a, 2b, 2c and 3 demonstrate the extreme sensitivity of the mechanical properties to grain size. In view of the above data, it is quite likely that a wide grain size distribution would lead to a large scatter in the high temperature strength properties and a narrower distribution would lead to a lesser degree of scatter. In the brittle regime (T<1,200° C.), the strength and toughness are controlled by the critical flaw size. It is well known in the part art that the flaw size scales with the grain size in these regimes and, hence, a wide grain size distribution would translate to a wide flaw size distribution and, therefore, to a wide scatter in the fracture properties. Likewise, a narrow grain size distribution, as obtained in the present invention, would result in a narrower strength distribution. From a design perspective, greater reliability and failure predictability, corresponding to failure within narrower stress limits, is highly desirable and these are obtainable under the teachings set forth in the present invention. Furthermore, as previously noted, subjecting the high ductility/low strength body to such operations as superplastic forging modifies the pore shape and morphology (if any) in the body from large spherical to smaller oblate. Such changes in pore morphology are very advantageous in improving the material strength characteristics since the stress concentrating effect of the pore is considerably reduced.

(3) Reduced tooling costs: FIG. 3 also shows the effectiveness of the grain size in controlling the strength of the $MoSi_2$ bodies. Furthermore, the figure is also illustrative of the improvements in the forgeability and formability of the alloys upon a reduction in the grain size. For example, while the stress required to press form a $MoSi_2$ body of 40 μm average grain size (composition B) at 1,300° C. is in the range of ~200 MPa; the stress required for an alloy (composition A) processed using the teachings of U.S. Pat. No. 5,454,999 is ~25 MPa for comparable temperatures and strain rates. This represents a reduction in the stress of 8 to 1. Likewise, for a comparable strain rate, grain size and stress level, the fine grained alloy would result in a considerable reduction of the forming temperature. Such reductions in the operating temperatures and/or stresses directly translate to huge savings in tooling and production costs.

(4) Tailorable properties: The ability to control the final achievable properties by control of the composition (and hence grain size) as detailed above offers advantages hitherto unattainable in the processing of $MoSi_2$-based materials. Essentially, properties can be potentially tailored for a wide variety of applications. Thus, for stress rupture and creep controlled applications, which demand high creep strength and dimensional accuracy under high temperature/high stress conditions, large grain structures are desirable, and such are obtainable with the low SiC compositions. Likewise, for applications requiring high toughness and low cycle fatigue resistance at intermediate temperatures, fine grain sizes are desired, and such are obtained through the high SiC compositions. In a similar fashion, compositions could be tailored and optimized to arrive at the microstructure which produces the desired combination of properties.

We claim:

1. A method for shaping a consolidated, substantially oxygen-free, equiaxed $MoSi_2$/SiC composite body having an average grain size of 10 μm or less, a SiC content of 2 to 60 v/o and relatively low strength and relatively high ductility comprising subjecting said composite body to plastic deformation under conditions of forming temperature and rate of deformation such that grain growth is substantially avoided, said $MoSi_2$/SiC composite body being obtained by providing particles of molybdenum, silicon and carbon in a proportion relative to each other required to produce a composite powder of $MoSi_2$ and SiC having a composition in that segment of the ternary diagram of FIG. 1 designated A, and subjecting said particles to mechanical alloying under conditions and for a time sufficient to produce said composite powder, followed by consolidation of said composite powder.

2. The method of claim 1 wherein said composite powder is consolidated by a powder metallurgical method.

3. The method of claim 2 wherein said powder metallurgical method comprises hot pressing.

4. The method of claim 1 wherein said consolidation of said composite powder comprises two stages I and II:

I.
  a) compacting said powder under pressure sufficient to form the powder into a compacted shape, said pressure enabling the maintenance of open porosity substantially throughout said compact;
  b) heating said compact under vacuum conditions for a time and at a temperature sufficient to result in deoxidation of said compact, essentially by a carbothermal reduction between said SiC and any silica present in said compact to form additional SiC and gaseous carbon oxides, the latter being evacuated from said compact as a result of said vacuum conditions and open porosity of said compact; said vacuum conditions and time and temperature of heating being insufficient to result in significant volatilization and loss of silicon from said compact; and II. consolidating the resulting compact by heating the compact under pressure, the time and temperature of heating and condition of pressure being sufficient to densify said compact while avoiding losses of silicon therefrom by volatilization.

5. The method of claim 4 wherein said powder is compacted in stage I. a) under a pressure of less than about 10 MPa.

6. The method of claim 4 wherein said compacted powder is heated in stage I. b) at a temperature of between about 1,350° C. and 1,500° C.

7. The method of claim 4 wherein said compacted powder is heating in stage I. b) under a vacuum of $10^{-2}$ Torr or better.

8. The method of claim 4 wherein said deoxidized compacted powder produced in stage I is consolidated in stage II at a temperature between about 1,600° C. and 1,750° C.

9. The method of claim 4 wherein said deoxidized compacted powder produced in stage I is consolidated in stage II by heating under a pressure between about 20 and 40 MPa.

10. The method of claim 4 wherein said consolidation of said deoxidized compacted powder in stage II is carried out in an inert atmosphere.

11. The method of claim 4 including the step of cooling and recovering the cooled consolidated product.

12. The composition of matter formed by the method of claim 1.

13. An article of manufacture comprising the composition of matter of claim 12.

14. The method of claim 1 including the step of heat-treating the shaped composite body produced by the method of claim 1 at a temperature sufficient to coarsen the grain structure thereof thereby converting the condition thereof to one of relatively high strength and relatively low ductility.

15. The composition of matter formed by the method of claim 14.

16. An article of manufacture comprising the composition of matter of claim 15.

17. The method of claims 1 or 14 including controlling the grain size of said shaped composite body or said heat-treated shaped composite body comprising conducting said mechanical alloying and consolidation steps while adjusting the ratio of SiC to $MoSi_2$ present therein to a predetermined value, thus producing said shaped composite body or said heat-treated shaped composite body having a predetermined grain size.

* * * * *